US006462666B1

(12) United States Patent
Einck

(10) Patent No.: US 6,462,666 B1
(45) Date of Patent: Oct. 8, 2002

(54) HOUSING AND ELECTRIC CONNECTION PANEL FOR SUMP PUMP AND FULL SEPTIC TANK ALARM

(76) Inventor: Virgil A. Einck, 2913 Silver Cedar Rd., Oconomowoc, WI (US) 53066

( * ) Notice: Subject to any disclaimer, the term of this patent is extended or adjusted under 35 U.S.C. 154(b) by 0 days.

(21) Appl. No.: 08/433,548

(22) Filed: May 3, 1995

(51) Int. Cl.[7] .............................................. G08B 21/00
(52) U.S. Cl. ...................... 340/623; 340/618; 361/752; 417/14
(58) Field of Search ................................. 340/623, 624, 340/618; 174/50, 51, 52.1; 361/752, 756, 775; 417/14, 40, 63

(56) References Cited

U.S. PATENT DOCUMENTS

| | | | | |
|---|---|---|---|---|
| 3,145,761 A | * | 8/1964 | Reusch .......................... 431/64 |
| 3,634,842 A | * | 1/1972 | Niedermeyer ............... 340/623 |
| 4,087,204 A | * | 5/1978 | Niedermeyer ................... 417/2 |
| 4,228,427 A | * | 10/1980 | Niedermeyer ............... 340/623 |
| 4,230,578 A | | 10/1980 | Culp et al. ..................... 210/86 |
| 4,255,747 A | * | 3/1981 | Bunia .......................... 340/624 |
| 4,262,216 A | * | 4/1981 | Johnston ..................... 307/118 |
| 4,369,438 A | | 1/1983 | Wilhelmi ..................... 340/623 |
| 4,418,712 A | * | 12/1983 | Braley ......................... 340/624 |
| 4,553,561 A | * | 11/1985 | Morris ......................... 137/362 |
| 4,814,752 A | * | 3/1989 | Lehman ....................... 340/623 |
| 4,922,234 A | | 5/1990 | Murphy ....................... 340/608 |
| 5,015,152 A | * | 5/1991 | Greene .......................... 417/40 |
| 5,032,954 A | * | 7/1991 | Juza ............................. 361/756 |
| 5,125,247 A | * | 6/1992 | Mills ............................ 340/624 |
| 5,256,834 A | | 10/1993 | Gehring ......................... 174/37 |
| 5,272,279 A | * | 12/1993 | Filshie .......................... 174/50 |
| 5,283,569 A | | 2/1994 | Nelson ........................ 340/623 |
| 5,377,080 A | * | 12/1994 | Lin ............................. 361/756 |
| 5,568,362 A | * | 10/1996 | Hansson ...................... 361/736 |

* cited by examiner

*Primary Examiner*—Brent A. Swarthout
(74) *Attorney, Agent, or Firm*—Robert T. Johnson

(57) ABSTRACT

Disclosure is made of a housing and electric connection panel for sump pump and full septic tank alarm apparatus which includes an electric connection panel with a female receptacle and electrical terminal strip mounted on the panel and power lines leading onto the panel, and this electric connection panel mounted in grooves in a panel housing, and this panel housing attached to a sump tank by a connector pipe nipple extending through the side wall of the panel housing and through the side wall of the septic tank and electric wire leads to from the sump pump float switch, sump pump, and full tank alarm each of which is in the sump tank and the electric leads extending through the connector pipe nipple and into the panel housing and the piggy back male plug of the sump pump switch plugged into the female receptacle on the electrical panel and the male plug of the sump pump plugged into the piggy back of the sump pump switch, and the electric power supply to the electrical connector panel entering through the bottom through an inlet for the electric power lines into the panel housing.

3 Claims, 5 Drawing Sheets

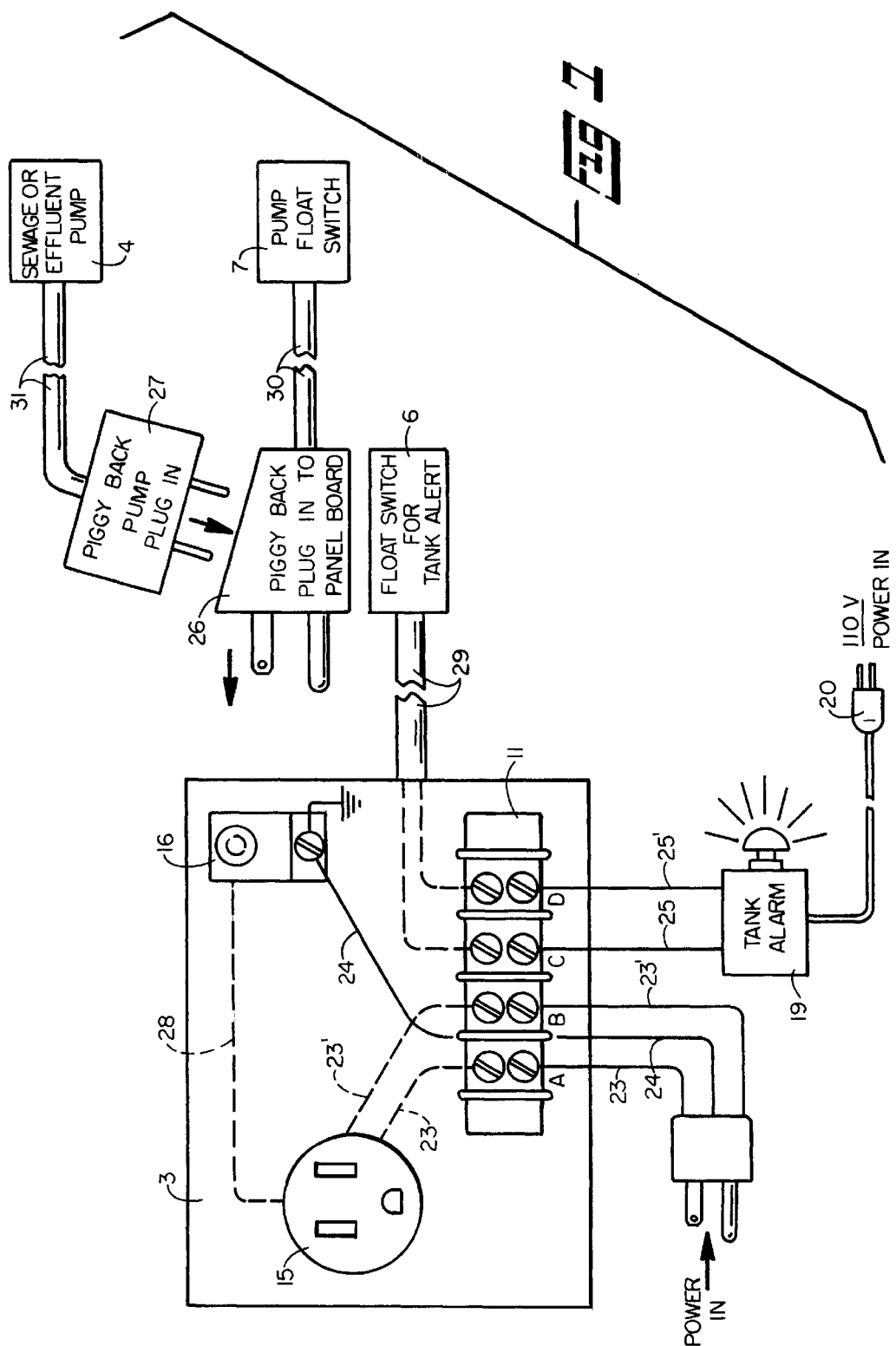

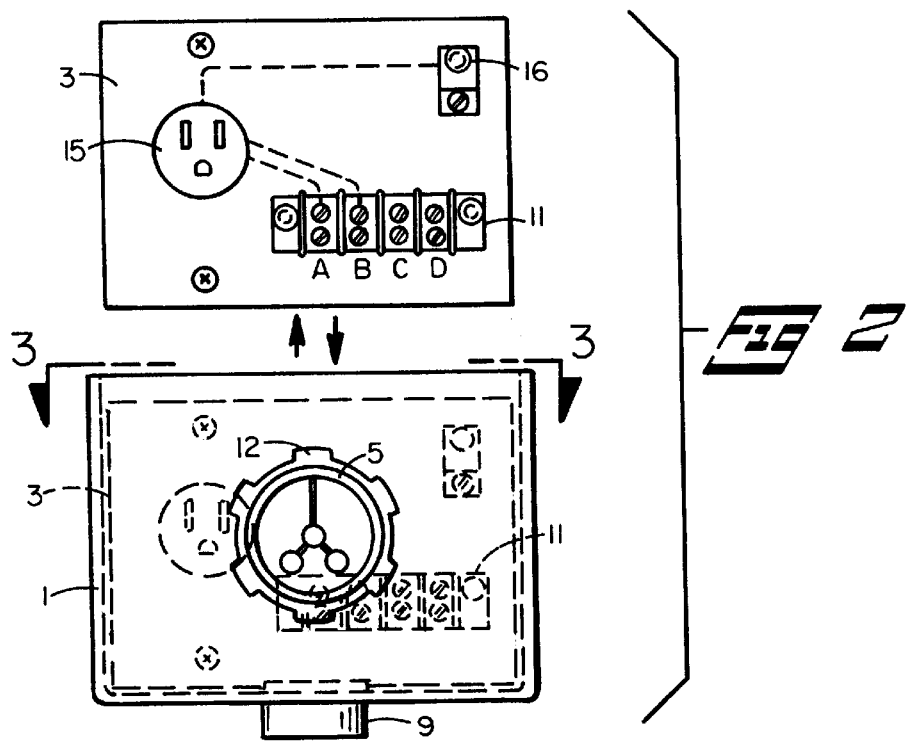
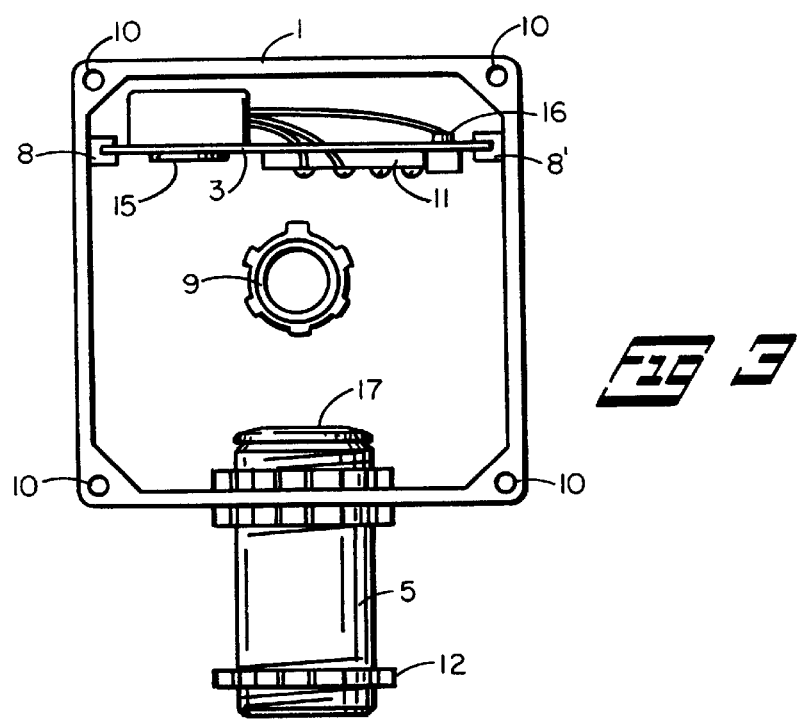

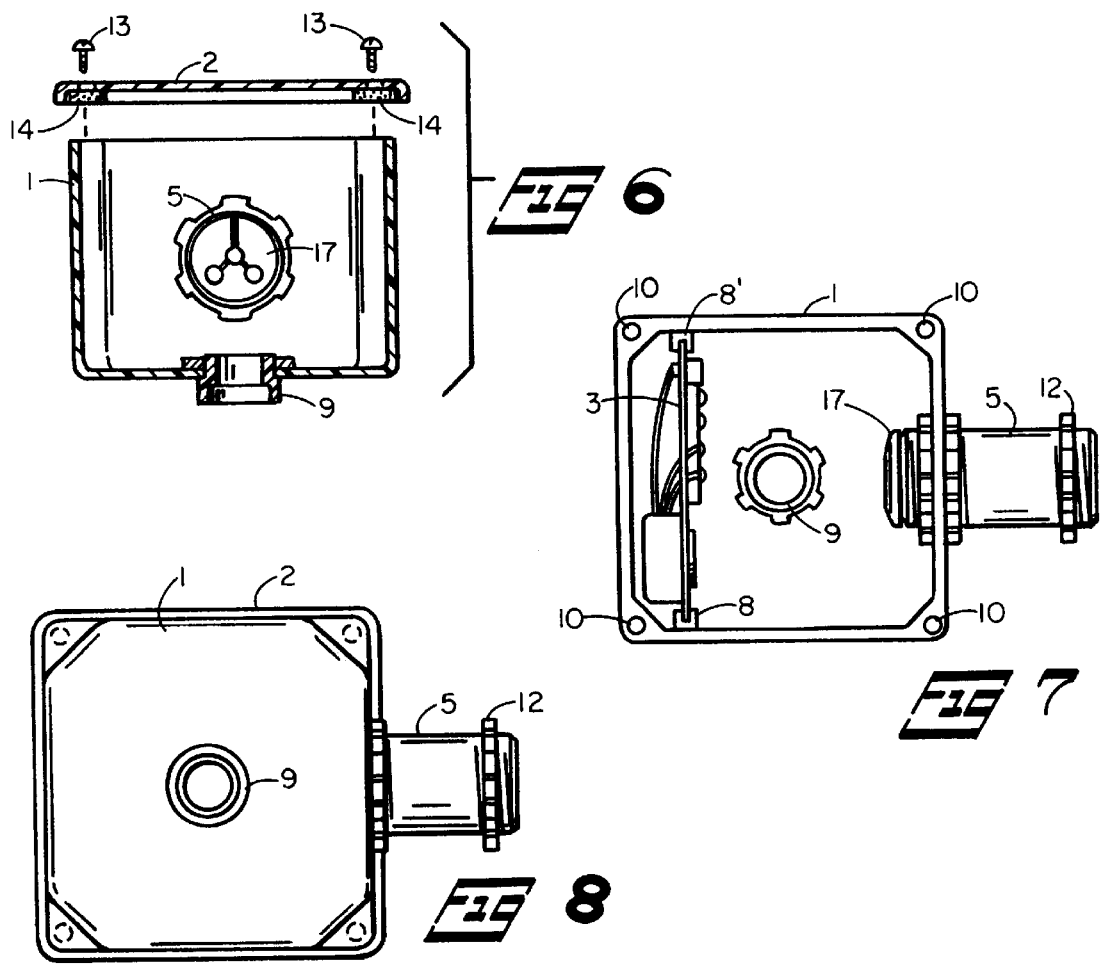
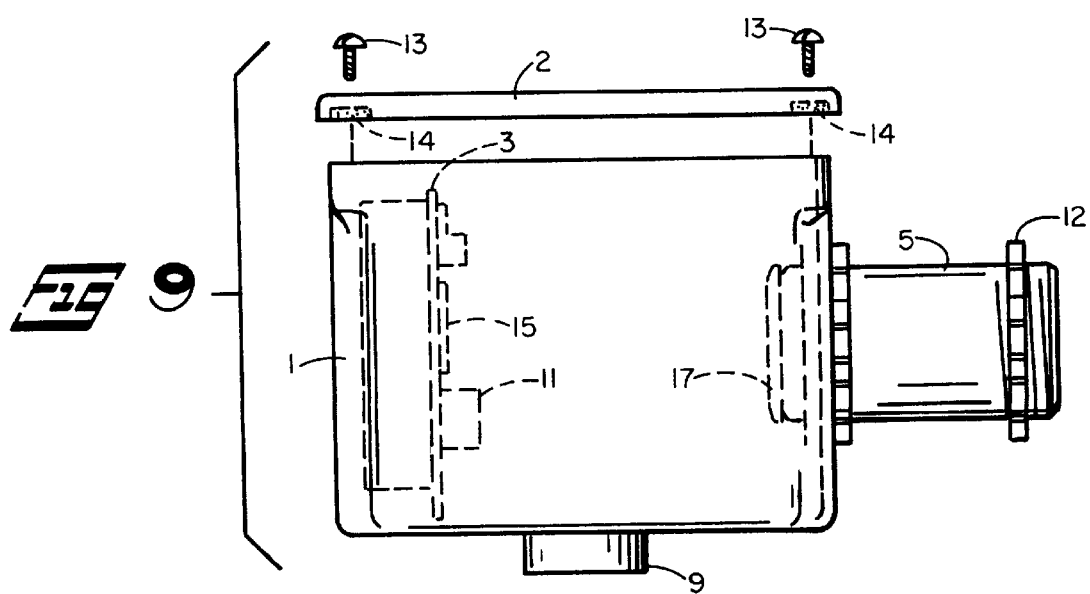

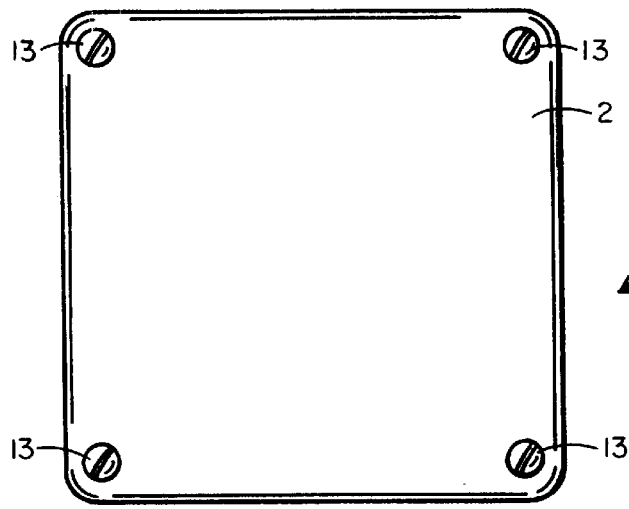
FIG 10
FIG 11
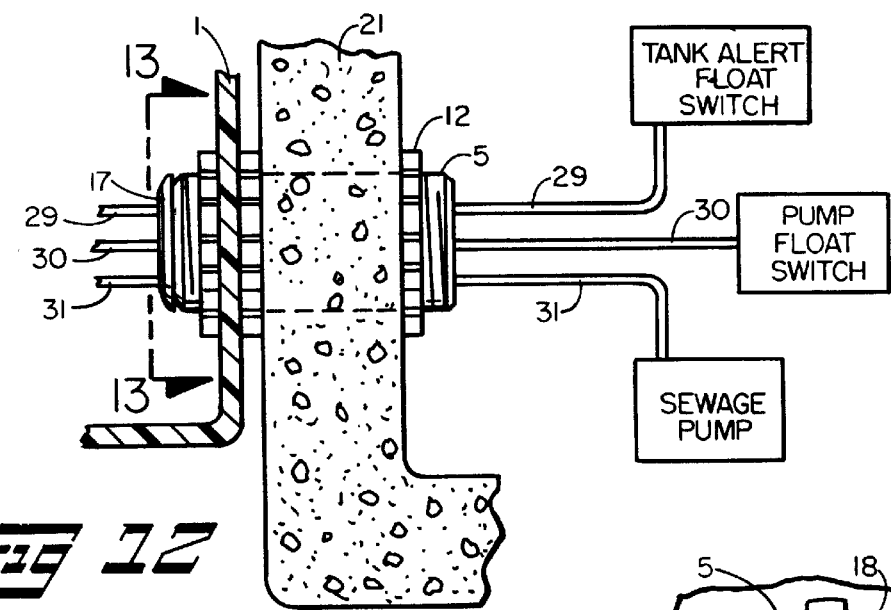
FIG 12
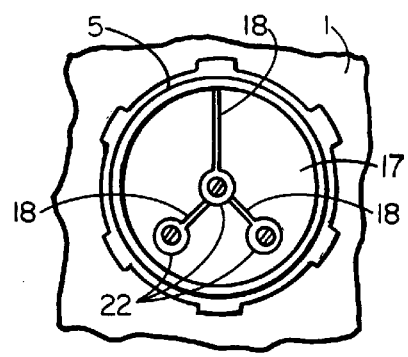
FIG 13

HOUSING AND ELECTRIC CONNECTION PANEL FOR SUMP PUMP AND FULL SEPTIC TANK ALARM

SUMMARY OF INVENTION

This invention is to disclose a housing and electric connection panel for sump pump and full septic tank alarm, wherein a pre-wired panel of electrical insulation material mounted in a housing and leads from sump pump float switch and sump pump and a liquid level full septic tank alarm plugged into and wired onto the pre-wired panel and two separate electric power sources wired onto the pre-wired panel in the housing.

PRIOR ART

U.S. Pat. No. 4,228,427 for MONITOR APPARATUS FOR SUMP PUMPS. Audible or visual warning signals to indicate malfunctioning pump, to actuate fail-safe circuits.

U.S. Pat. No. 4,230,578 for SEWAGE EFFLUENT VOLUME CONTROL AND ALARM ARRANGEMENT. Disclosure is made of float switches in the holding tank.

U.S. Pat. No. 4,369,438 for SUMP PUMP DETECTION AND ALARM. Disclosure is made of high water level and electrical power failure alarm system including radio transmitter when either condition exists.

U.S. Pat. No. 4,922,234 for SEWER ALARM. A buoyant mercury switch is mounted in a sewer pipe and a battery connected to the switch.

U.S. Pat. No. 5,256,834 for JUNCTION CENTER. Disclosure is made in this patent of a junction center main tube connected to the sewer riser and wires extending into and out of the main tube.

U.S. Pat. No. 5,283,569 for FLOAT ACTUATED FLOOD WARNING SYSTEM WITH REMOTE TELEPHONE REPORTING. Disclosure is made of a flood warning system including a stilling well having three vertically spaced apart float switches, a telephone alarm dialer actuated by the float switches.

OBJECTS OF INVENTION

An object of this invention is to disclose an insulated electric connector panel, housing, and full septic tank alarm apparatus mounted on the insulated electric connector panel and a female power grounded outlet and a four slot terminal strip and the female power grounded outlet hot lines connected to two slots in the four slot terminal strip and, a ground wire connection extending from ground screw of the female power grounded outlet and the ground wire connection from the female power grounded outlet extending to a pin mounted on the electrical insulation panel and, hot line wires connected to the two slots of the four slot terminal connected to the female power grounded outlet and the ground wire of the hot line connected to the pin mounted on the electrical insulation panel and separate hot line electric wires attached to two remaining slots of the terminal strip and alarm float switch connected to the hot line electric wires attached to the remaining slots of the terminal strip and electric alarm apparatus connected in series to the separate hot line electric wires attached to the two remaining slots of the terminal.

Another object is to disclose a sump pump electric connection panel, housing and alarm apparatus of a housing and a pipe segment mounted on and extending outward from and through the side wall of the housing and extending through the side wall of the housing and through a side wall of the sump tank and the electrical connector panel enclosed in the housing and a female electric plug-in and a terminal strip mounted on the electrical connector panel and the electrical connector panel slip mounted in grooves in the housing and, a removable cover on the housing and, a bottom entry conduit extending through the bottom wall of the housing and alarm apparatus including a sensor float and alarm signal apparatus connected to the sensor float and the sensor float and the alarm apparatus wired to the terminal strip.

Another object is to disclose a sump pump electric connection panel and housing, of a sump pump switch on-off control with a piggy-back plug plugged into the female plug-in mounted on the electrical connector panel and, a sump pump in the sump and a male plug on the power line extending to the pump and the male plug plugged into the female of the piggy back plug of the pump switch on-off control and alarm apparatus of a sensor float switch electrically connected to the terminal strip, apart from the connections on the terminal strip of the pump and sensor, and alarm alert apparatus connected to the alarm float switch electrically connected to the terminal strip.

Another object is to disclose an electrical connection panel, for sump pump control apparatus, mounted in a panel housing and the housing of a cube shape with a removable housing cover and threaded female inserts mounted in four corners of the top of the housing and a threaded connector pipe nipple mounted on the side of the housing and a nut threaded onto the connector pipe nipple, to facilitate mounting the housing on to a septic tank, and an inlet for electric power lines into the panel housing on the bottom of the housing and a panel housing cover with a suitable gasket for fitting over the top of the housing and held down with cover hold down screws, and a grommet for fitting into the connector pipe nipple and this grommet having grommet cuts connecting to grommet spaces for electric wires leading to and from the float and pump switches and full tank alarm.

BRIEF DESCRIPTION OF DRAWINGS

FIG. 1—Schematic of electrical panel wiring junctures.

FIG. 2—Schematic elevational view of electric panel in relation to panel housing.

FIG. 3—Plan view of panel housing with panel inserted in mounting position.

FIG. 6—Cross section elevational view of panel housing.

FIG. 7—Plan view of top of panel housing.

FIG. 8—Bottom plan view of panel housing.

FIG. 9—Enlarged elevational view of panel housing.

FIG. 10—Elevational view of panel housing cover.

FIG. 11—Plan view of panel housing cover.

FIG. 12—Sectional elevational view of panel housing and connector pipe.

FIG. 13—End view of grommet in connector pipe for electric power wire leads.

LEGENDS OF DRAWINGS

Figure 4:
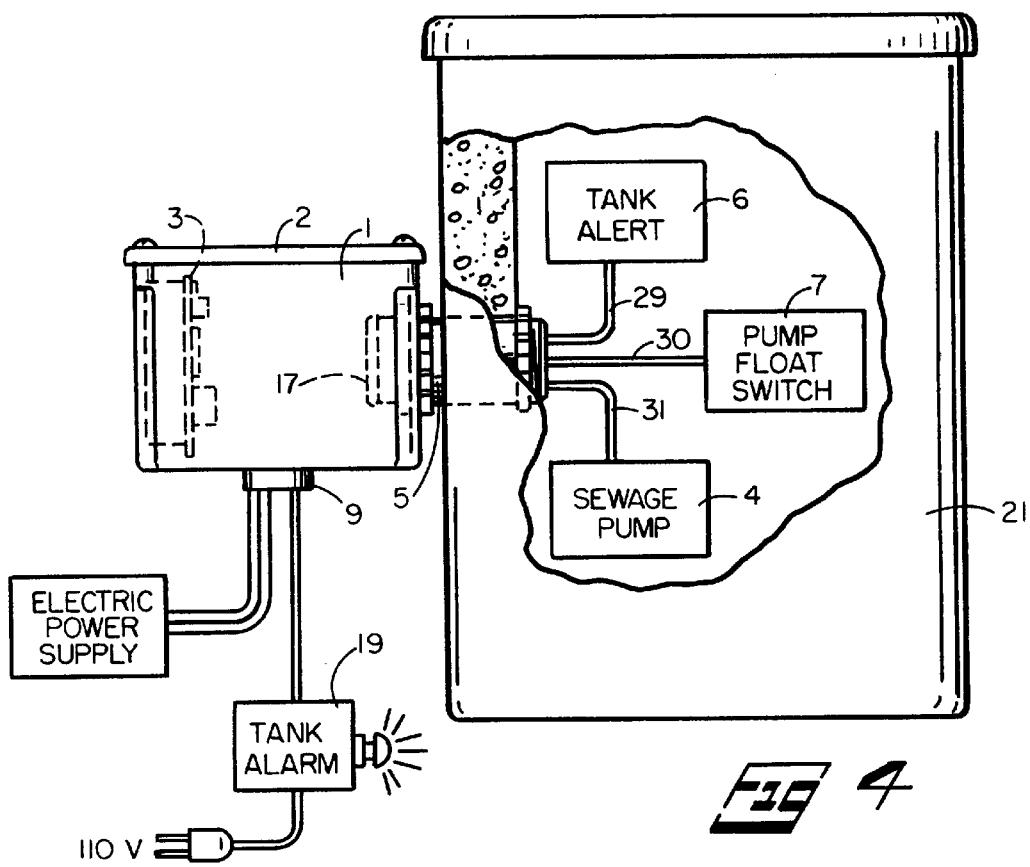
FIG. 4—Elevational view of panel housing attached to septic tank.
Figure 5:
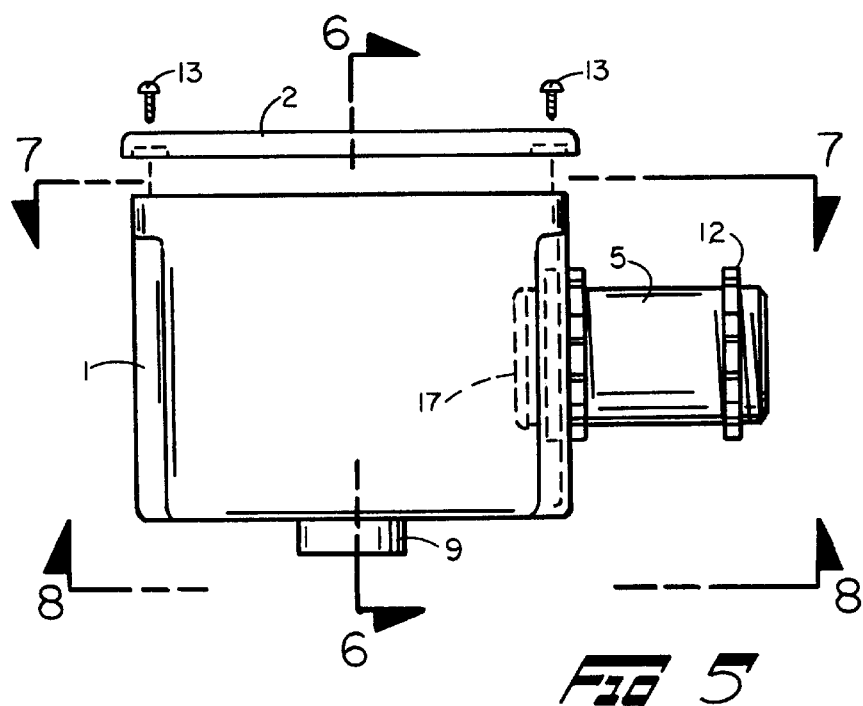
FIG. 5—Elevational view of panel housing.

1—panel housing.
2—panel housing cover
3—sump pump electrical connector panel.
4—sump pump.
5—connector pipe nipple.
6—full tank alert float switch.
7—sump pump float switch.
8, 8'—slots or grooves in housing for electric panel.
9—inlet for electric power lines into panel housing.
10—female threaded inserts 11—electrical terminal strip.
12—threaded nut.
13—panel housing cover hold down screws.
14—gasket.
15—female grounded receptical for male plug.
16—grounding pin.
17—grommet.
18—grommet cuts.
19—septic tank or sump high level alarm.
20—male electric plug.
21—septic tank or sump.
22—grommet space for wire
23, 23' hot power line
24—neutral line of hot power line.
25,25' power line for tank alert
26—piggy back male plug for pump float switch.
27—piggy back male plug for pump and plugs into female section of piggy back plug for pump float switch.
28—ground wire from female plug to grounding pin.
29—electric wire leads to and from float switch of full tank alert to electrical terminal strip.
30—electric wire leads from pump float switch to piggy back plug-in to female grounded receptical
31—electric wire leads from sump pump to plug into piggy back plug of pump float switch
A,B,C,D—connections on electrical terminal strip.

In the discussion which follows legend descriptions may be used or words derived therefrom may be referred to.

DETAILED DESCRIPTION OF THE INVENTION

This invention is to disclose a sump pump electric connection panel 3, (FIG. 1) panel housing 1 (FIGS. 2, 3) and alarm apparatus 6, 19 (FIGS. 1, 12) of an electrical insulation panel 3, and mounted on the electrical insulated panel 3 a female power grounded outlet 15 (FIGS. 1, 2) and a four slot electrical terminal strip 11, (FIGS. 1, 2) and,the female power grounded outlet 15, and hot lines 23, 23' connected to two slots A,& B in the four slot terminal strip 11 and, a ground or neutral wire 24 connecting to pin 16 and from ground screw contact of the female power grounded outlet 15 neutral or ground wire 28 extends to grounding pin 16 mounted on the electrical insulation panel 3 and, hot line wires 23, 23' connected to two slots A, B of the four slot terminal strip 11 connected in turn to the female power grounded outlet 15 and the ground or neutral wire 24 of the hot lines 23, 231 connected to the pin 16 mounted on the electrical insulation panel 3 and separate hot line electric wires 25, 25' attached to two remaining slots C, D of the electrical terminal strip 11 and alarm float switch 6 connected to the hot line electric wires attached to the C, D, remaining slots of the electrical terminal strip 11 and electric alarm apparatus 19 connected in series to the separate hot line electric wires 25, 251 attached to the slots C, D of the electrical terminal strip.

Further disclosure is made of a sump pump electric connection panel 3, panel housing 1 and alarm apparatus 19 of a housing 1 and a connector pipe nipple 5 (FIGS. 3, 4) mounted on and extending outward (see FIGS. 5,7,8,9) from and through the side wall of the panel housing 1 and extending through the side wall of the housing 1 and through a side wall of the sump or septic tank 21 (FIG. 4) and the electrical connector panel 3 enclosed in the housing 1 (FIGS. 3, 4) and a female electric plug-in 15 and an electrical terminal strip 11 mounted on the electrical connector panel 3 and the electrical connector panel 3 slip mounted in grooves 8 (FIG. 3) in the panel housing 1 and,a removable cover 2(FIGS. 5,6,9,10,11) on the panel housing 1 and, an inlet 9 for electric power lines 23, 23',24, 25 and 25' which inlet is on the bottom of the panel housing 1. FIGS. 2, 4, 5, 6, and 9) extending through the bottom wall of the panel housing 1 and sump or tank high level alarm 19 apparatus including a float switch 6 and alarm signal or tank high level alarm 19 apparatus connected to the full tank alert float switch 6 apparatus wired to the terminal strip 11.

Further disclosure is made of a sump pump electrical connector panel 3 and housing 1, of a sump pump float switch on-off control with a piggy-back plug 26 plugged into the female grounded receptical 15 for male plug mounted on the electrical connector panel 3 and, a sump pump 4 in the sump tank and a male plug 27 on the power line extending to the pump 4 and the male plug 27 plugged into the female side of the piggy back plug 26 of the pump float switch 7 on-off control, and alarm apparatus 19 with a float switch 6 electrically connected to the electrical terminal strip 11, apart from the connections on the terminal strip 11 of the pump and pump float switch 7 and sump or tank high level alarm 19 apparatus connected to the alarm float switch 6 electrically connected to the terminal strip and male electric plugs 20 plugged into power source to activate the full tank or sump alarm apparatus.

Further, disclosure is made of an electrical connector panel 3, for sump tank pump control apparatus, mounted in a panel housing 1 and the housing 1 is of a cube shape (See FIGS. 2–11) with a removable panel housing cover 2 and threaded female inserts 10, (see FIG. 11) mounted in the four corners at the top of the housing 1 and a threaded connector pipe nipple 5 mounted on a side of the housing 1 and a threaded nut 12, threaded onto the connector pipe nipple, 5, to facilitate mounting the housing 1 on to a sump or septic tank, 21 (see FIG. 4) and an inlet 9 for electric power lines into the panel housing I on the bottom of the housing 1 and a panel housing cover 2 with a suitable gasket 14 for fitting over the top of the panel housing 1 and held down with cover hold down screws 13, (see FIGS. 6 and 9)and a grommet 17 (see FIGS. 12, 13) for fitting into the connector pipe nipple 5 and this grommet 17 having grommet cuts 18 connecting to grommet spaces 22 for electric wires leading to and from the pump float switch 7, sump pump 4 and tank alert float switch 6.

Referring now to FIGS. 4 and 12, which shows the assembly of the components and includes the mounting of the panel housing 1 on to the sump or septic tank 21 by inserting connector pipe nipple 5, mounted on housing 1, into an opening in the septic tank 21, and the sump pump 4, pump float switch 7, and full tank alert float switch 6, are suitably positioned or placed in the septic tank 21 with the electric wire lines extending from each through the connector pipe nipple 5 and through grommet spaces 22 of grommet 17 into the housing 1 and piggy back plug 26 for pump float switch inserted into female grounded receptical 15 for male plug, and piggy back pump plug in for sump pump plugged into piggy back plug 26 for pump float switch 26, and line 29 from float switch for tank alert 6, connected to C and D connections on electrical terminal strip 11. The power lines 23, 23' 24, 25 and 25' enter the panel housing from underneath the housing, through inlet 9 for electric power lines into the panel housing 1. The above mentioned grommet 17, is tightly inserted into connector pipe nipple 5, and may be at either end of this pipe nipple 5 to give a water tight seal, and the cover 2 with gasket 14 is placed over the housing 1, and anchored down with screws 13, and male electric plug 20 inserted in a power supply for the tank alarm 19 and separate power supply to the pump float switch 7 and sump pump 4 is turned on to set this apparatus in operating condition.

Referring to FIGS. 1, 4, and 12 to describe the assembly of this apparatus electric wire leads 29 from full tank alert float switch 6 extend through connector pipe nipple 5 and through grommet space 22 for wires in grommet 17 and into panel housing 1 and connected to C and D connections on electrical terminal strip 11 on electrical connector panel 3, mounted in slots or grooves 8, 8' in panel housing 1, and electric wire leads 30 from sump pump float switch 7 in septic tank 21 extend through connector pipe nipple 5 and through grommet spaces 22 for wires in grommet 17 and into panel housing 1, and plug into female grounded receptacle 15 for male plug, and electric wire leads 31 from sump pump 4 to plug into piggy back plug 26 of sump pump float switch 7. The panel housing 1 is attached to septic tank 21 by inserting connector pipe nipple 5, into and through a suitable opening in septic tank 21, and subsequently tightening the threaded nut 12 on connector pipe nipple 5 on the inside of the inside wall of the septic tank 21.

The piggy-back electrical plugs are standard commercial items well known to those familiar in this field.

The preferred material for the panel housing 1 panel housing cover 2, and electrical connector panel 3 is a plastic material such as polyester, polyvinyl, urethane or polyolefin, and in particular for the connector panel 3 electrical insulative material is preferred.

Having described my invention I claim:

1. Housing and electric connection panel for sump pump and full septic tank alarm apparatus, wherein the improvement comprises;
    a—an electrical insulation panel and
    b—mounted on said insulation panel a female power grounded outlet and a four slot terminal strip and,
    c—female power grounded outlet hot lines connected to two slots in said four slot terminal strip and,
    d—a ground wire connection extending from ground screw of said female power grounded outlet and
    e—said ground wire connection from said female power grounded outlet extending to a pin mounted on said electrical insulation panel and,
    f—hot line wires connected to two slots of said four slot terminal connected to female power grounded outlet and
    g—a ground wire of a hot line connected to said pin mounted on said electrical insulation panel and
    h—separate hot line electric wires attached to two remaining slots of said terminal strip and,
    i—alarm float switch connected to said hot line electric wires attached to said remaining slots of said terminal strip and
    j—electric alarm apparatus connected in series to said separate hot line electric wires attached to said two remaining slots of said terminal strip,
    k—a sump pump float switch with a piggy-back plug plugged into a female plug-in mounted on said electrical insulation panel and,
    l—a sump pump and a male plug on power line extending to said pump and said male plug plugged into said piggy back plug of said sump pump float switch and
    m—said full septic tank alarm apparatus comprising said alarm float switch electrically connected to said terminal strip, apart from connections on said terminal strip of said pump float switch, and said electric alarm apparatus connected to said alarm float switch electrically connected to said terminal strip.

2. Housing and electric connection panel for sump pump and septic full tank alarm apparatus comprising;
    a—a sump pump float switch with a piggy-back male plug plugged into a female plug-in mounted on said electric connection panel,
    b—a sump pump in a sump and a male plug on power line extending to said sump pump and said male plug plugged into said piggy back male plug of said sump pump float switch and
    c—septic full tank alarm apparatus comprising a float switch electrically connected to a four slot terminal strip, apart from [said] connections on terminal strip of said pump and full tank alarm apparatus connected to said float switch electrically connected to said four slot terminal strip;
    d—mounted on said electric connection panel a female power grounded outlet and said four slot terminal strip and,
    e—hot lines connected to two slots in said four slot terminal strip,
    f—a ground wire connection extending from a ground screw of said female power outlet,
    g—said ground wire connection from said female power outlet extending to a pin mounted on said electric connection panel,
    h—said hot line wires connected to two slots of said four slot terminal strip connected to said female power outlet and
    i—a ground wire from said female power outlet connected to said pin mounted on said electrical insulation panel,
    j—separate hot line electric wires attached to two remaining slots of said four slot terminal strip,
    k—an alarm float switch connected to said hot line wires attached to said remaining slots of said terminal strip and
    l—electric alarm apparatus connected to said electric wires attached to said remaining slots of said four slot terminal.

3. Housing and electric connection panel for a sump pump and full septic tank alarm apparatus, of claim 1, further comprising;
    a—a panel housing comprising a side mounted connector pipe nipple mounted on and extending outward from and through the side wall of said panel housing and extending through a side wall of a sump septic tank and into said sump septic tank,
    b—an electrical connector panel enclosed in said panel housing,
    c—a female electric plug-in and a four slot terminal strip mounted on said electrical connector panel
    d—said electrical connector panel mounted in grooves in said housing,
    e—a removable cover on said housing,
    f—a bottom entry conduit extending through the bottom wall of said housing,
    g—said alarm apparatus including said alarm float switch and said electrical alarm apparatus connected to said alarm float switch of said alarm apparatus,
    h—said alarm float switch of said alarm apparatus wired to said four slot terminal strip,
    i—a grommet fitting into said side mounted connector pipe nipple and,
    j—wires extending to and from said alarm signal and said sensor float switch through said grommet in said side mounted connector pipe nipple.

* * * * *